(12) United States Patent
Mizuta et al.

(10) Patent No.: US 7,907,289 B2
(45) Date of Patent: Mar. 15, 2011

(54) SUBSTRATE MEASURING STAGE

(75) Inventors: Masao Mizuta, Kyoto (JP); Motoaki Hamada, Kyoto (JP)

(73) Assignee: Horiba, Ltd. (JP)

( * ) Notice: Subject to any disclaimer, the term of this patent is extended or adjusted under 35 U.S.C. 154(b) by 278 days.

(21) Appl. No.: 12/210,759

(22) Filed: Sep. 15, 2008

(65) Prior Publication Data

US 2009/0073460 A1    Mar. 19, 2009

(30) Foreign Application Priority Data

Sep. 13, 2007  (JP) ................................ 2007-238167
Jun. 16, 2008  (JP) ................................ 2008-157270

(51) Int. Cl.
  *G01B 11/14*    (2006.01)
  *G01B 1/06*    (2006.01)
(52) U.S. Cl. ...................... 356/614; 356/630; 356/237.2
(58) Field of Classification Search .......... 356/600–614, 356/237.1–237.5, 244–246, 630–632; 250/225, 250/306, 307, 310, 311, 396 R, 397, 492.1–492.3; 29/703, 714, 720, 721, 822, 888, 269
See application file for complete search history.

(56) References Cited

U.S. PATENT DOCUMENTS

| | | | |
|---|---|---|---|
| 2004/0207838 A1* | 10/2004 | Ebert et al. | 356/237.4 |
| 2006/0169900 A1* | 8/2006 | Noji et al. | 250/310 |
| 2008/0013089 A1* | 1/2008 | Ishii et al. | 356/400 |

FOREIGN PATENT DOCUMENTS

| | | |
|---|---|---|
| JP | 63-131535 A | 6/1988 |
| JP | 02-097269 A | 4/1990 |
| JP | 06-097269 A | 4/1994 |
| JP | 09-129587 A | 5/1997 |
| JP | 2000-237983 A | 9/2000 |
| JP | 2000-294620 A | 10/2000 |
| JP | 2002-039745 A | 2/2002 |
| JP | 2006-332587 A | 12/2006 |

\* cited by examiner

*Primary Examiner* — Sang Nguyen
(74) *Attorney, Agent, or Firm* — Cantor Colburn LLP (57) ABSTRACT

A substrate measuring stage used for a curve measuring system measuring a curve of the substrate and an ordinary measuring system measuring each of or one of a physical quantity and a chemical quantity of the substrate other than the curve, may include the mounting board movable between an ordinary measurement position for the ordinary measuring system and a retreat position away from and downward of the ordinary measurement position; the plurality of support pins insertable into through-holes provided in the mounting board and fixed to a curve measurement position for the curve measuring system; and a drive mechanism vertically moving the mounting board between the ordinary measurement position and the retreat position. The curve measurement position is set between the ordinary measurement position and the retreat position.

9 Claims, 8 Drawing Sheets

| Measurement count | X direction (μm) | Y direction (μm) |
|---|---|---|
| 1 | 1.25 | 2.5 |
| 2 | 1.25 | 3.75 |
| 3 | 8.75 | 1.25 |
| 4 | 3.75 | 8.75 |
| 5 | 1.25 | 8.75 |
| 6 | 1.25 | 1.25 |
| 7 | 2.5 | −1.25 |
| 8 | −3.75 | 3.75 |
| 9 | 1.25 | 1.25 |
| 10 | 1.25 | 2.5 |
| Average value (μm) | 1.88 | 3.25 |
| Maximum value (μm) | 8.75 | 8.75 |
| Minimum value (μm) | −3.75 | −1.25 |
| Standard deviation (μm) | 3.08 | 3.24 |

SUBSTRATE MEASURING STAGE

FIELD OF THE INVENTION

The present invention relates to a substrate measuring stage normally used in a curve measuring system for measuring a curve of a substrate or a measuring system for measuring physical quantities and/or chemical quantities other than the curve.

BACKGROUND ART

A substrate measuring stage of this type includes a mounting board on which a substrate is mounted and a plurality of support pins provided to penetrate through the mounting board. The substrate measuring stage is structured so that the mounting board is fixed and the support pins are moved or both the mounting board and the support pins are moved and the support pins protrude from below the mounting board.

However, the substrate measuring stage configured to move the support pins has a problem of poor reproducibility of height positions of the support pins in every measurement.

Furthermore, the substrate measuring stage configured to adjust the height positions of the respective support pins has a following problem. It is difficult to locate tip ends of the respective support pins to be flat with one another. To solve the problem, there are proposed a substrate measuring stage structured so that a plurality of support pins is fixed to a common member and all the support pins are vertically moved simultaneously, as disclosed in, for example, Patent documents 1 and 2.

However, it is difficult to move up a plurality of support pins in parallel and the support pins are temporally offset at the time of contacting with the substrate. As a result, positional displacement occurs between the substrate mounted on the mounting board and the substrate supported on the support pins at least in an XY plane (in a horizontal direction).

Moreover, to compare a measurement result of a thickness or the like with that of a curve, it is considered to be necessary to set a measurement position for measurement of the thickness or the like equal in height to that for measurement of the curve. This is because focuses of a thickness measuring system and a curve measuring system deviate from each other to adversely influence measurement results if the substrate on the mounting board differs in height from the substrate on the support pins. If such a thing occurs, it is necessary to adjust the heights of the support pins to adjust the height of the substrate to be identical to the height at which the substrate is mounted on the mounting board after the substrate is supported on the support pins when the position of the substrate is moved from the position on the mounting board to the position on the support pins.

Nevertheless, as described, the substrate disadvantageously deviates in the horizontal direction during moving of the position of the substrate and the substrate measuring stage structured to move the support pins is disadvantageously poor in height reproducibility.

[Patent document 1] Japanese Unexamined Patent Publication No. 1994-97269

[Patent document 2] Japanese Unexamined Patent Publication No. 2006-332587

DISCLOSURE OF THE INVENTION

Problems to be Solved by the Invention

After dedicated studies about the substrate measuring stage to solve the conventional problems, the inventor of the present invention discovered that measurement results are not influenced by the deviation of the height of the substrate during the curve measurement downward of that of the substrate during a thickness measurement.

The present invention has been made to solve conventional problems at all once based on the above-described discovery. It is a main object of the present invention to improve reproducibility of positions of support pins and prevent a horizontal displacement of a substrate during a movement of a position of the substrate from a position on a mounting board and a position on the support pins.

Means Adapted to Solve the Problems

According to one aspect of the present invention, there is provided a substrate measuring stage used for a curve measuring system measuring a curve of a substrate and an ordinary measuring system measuring each of or one of a physical quantity and a chemical quantity of the substrate other than the curve, including: a mounting board movable between an ordinary measurement position for the ordinary measuring system and a retreat position away from and downward (direction including a vertical direction component) of the ordinary measurement position; a plurality of support members having a support end supporting the substrate, a tip end of the support end being fixed to a curve measurement position for the curve measuring system irrespective of movement of the mounting board; and a lifting mechanism moving the mounting board between the ordinary measurement position and the retreat position, wherein the curve measurement position is set between the ordinary measurement position and the retreat position.

With such a configuration, the support member is fixed to the curve measurement position. Therefore, a position reproducibility of the support member can be improved and it is possible to prevent the substrate from being horizontally displaced when the position of the substrate moves from a position on the mounting board to a position on the support member or from the position on the support member to the position on the mounting board. Further, a lifting mechanism for the support member can be dispensed with, so that the substrate measuring stage can be made small in size and manufactured at low cost.

A specific operation is as follows. In a state in which the mounting board is located at the ordinary measurement position and in which the substrate is mounted on the mounting board, the support member penetrates through a through-hole of the mounting board, protrudes from an upper surface of the mounting board, and supports the substrate as the mounting board moves from the ordinary measurement position to the retreat position. On the other hand, in a state in which the mounting board is located at the retreat position and in which the support member supports the substrate, the support pins penetrates through the through-hole of the mounting board and lowers from the upper surface of the mounting board, and the mounting board holds the substrate as the mounting board moves from the retreat position to the ordinary measurement position.

To ensure measurement convenience at time of comparing a measurement result of ordinary measurement with that of measurement of the curve, it is preferable that a difference between the curve measurement position and the ordinary measurement position falls within a range substantially having no influence on measurement of the curve.

To make a height of the support member adjustable for every measurement target, it is preferable that the substrate measuring stage includes a height adjustment mechanism adjusting the height of the support member.

It is considered that a specific embodiment of the mounting board is a chuck board sucking the substrate.

To prevent the substrate from being displaced relatively to the support member by inertia to be able to thereby horizontally move the substrate at high speed and to eventually reduce time for the measurement of the curve, it is preferable that the support member includes a displacement prevention part preventing a displacement of the substrate. It is more preferable that the displacement prevention part prevents a horizontal displacement of the substrate.

As a specific mode for preventing the substrate from being displaced relatively to the support member by inertia, it is considered that the displacement prevention part sucks the substrate.

To mount the substrate at a same position on the mounting board and to facilitate measuring curves of a plurality of substrates having various sizes without replacing stages or the like, to support the substrate on minimum support members to lessen the influence of the support members on the measurement of the curve, and to reduce contamination on the substrate, it is preferable that a plurality of support members constitute support member groups different in a size of the substrate to be supported, a support member group supporting a small substrate is arranged inside of a support member group supporting a large substrate, and that a curve measurement position of the support member group supporting the small substrate is set lower than a curve measurement position of the support member group supporting the large substrate.

It is considered that a specific embodiment of the ordinary measurement system is an ellipsometer measuring a thickness of a film formed on the substrate.

By using the substrate measuring stage according to the present invention in a substrate measuring equipment, the substrate can be measured at high accuracy with high resolution.

To minimize damage or contamination generated by contact of the support member with the substrate during the measurement of the curve, it is preferable that the support member holds an outer circumference of the substrate. This is because an outer circumference of the substrate is a portion to be discarded without being used as chips and problems hardly occur even if damage or contamination is generated on the outer periphery of the substrate.

To prevent the substrate from being horizontally displaced by inertia while holding the outer periphery of the substrate, it is preferable that the support member has a protrusion protruding from a support end of the support member and contacting with a side surface of the substrate.

If the support member is thermally deformed by a change in external temperature around the support member, the supported substrate is often inclined. If the substrate is inclined, the curve of the substrate as well as the inclination of the substrate generated by the thermal deformation of the support member is measured during measurement of the curve, resulting in deterioration in a curve measurement accuracy. To suppress the adverse influence of such a temperature change on the measurement of the curve of the substrate, it is preferable to provide a thermal deformation reduction mechanism reducing a thermal deformation of the support member.

To prevent the surrounding air having temperature change from contacting with the support member and to reduce the thermal deformation, the thermal deformation reduction mechanism preferably includes a cutoff wall surrounding the support member.

To reduce the thermal deformation of the support member and to prevent the measurement of the curve from being influenced by the temperature change of the surrounding air by simple temperature control, the thermal deformation reduction mechanism preferably includes a heater keeping a temperature of the support member to be constant and higher than that of the surrounding air.

EFFECT OF THE INVENTION

The present invention configured as described above can improve the position reproducibility of each support member and prevent the substrate from being horizontally displaced when the position of the substrate moves from the position on the mounting board to the position on the support member or from the position on the support member to the position on the mounting board.

PREFERRED EMBODIMENTS OF THE INVENTION

Figure 1:
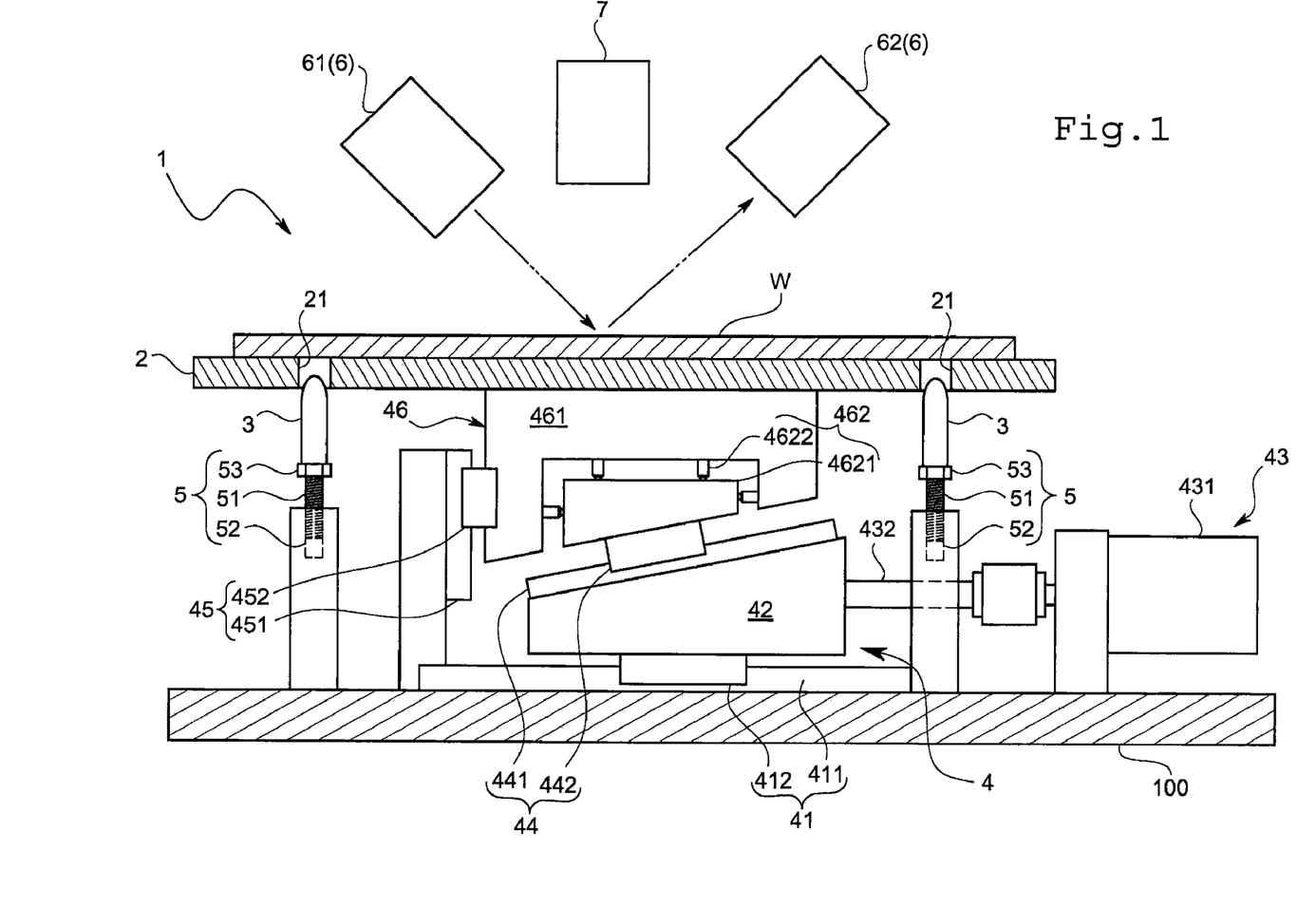
FIG. 1 is a typical configuration diagram of a substrate measuring stage according to an embodiment of the present invention.
Figure 2:
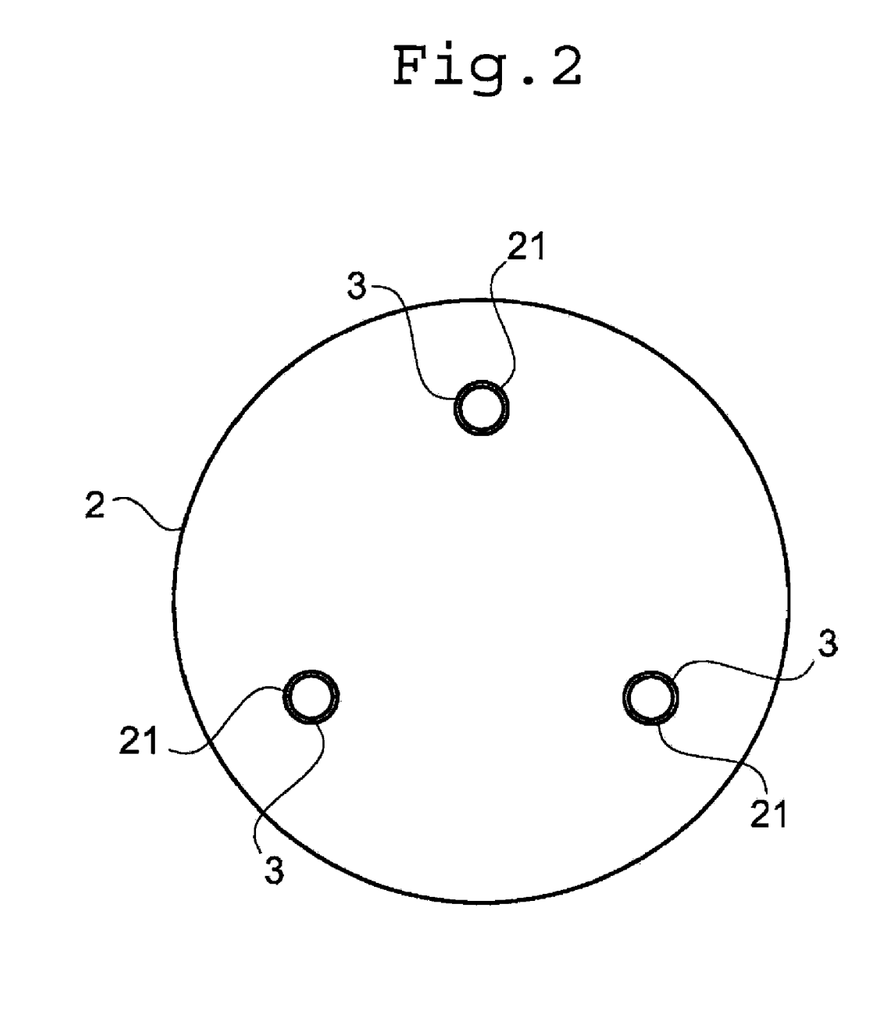
FIG. 2 is a plane view of a mounting board according to the embodiment.
Figure 3:
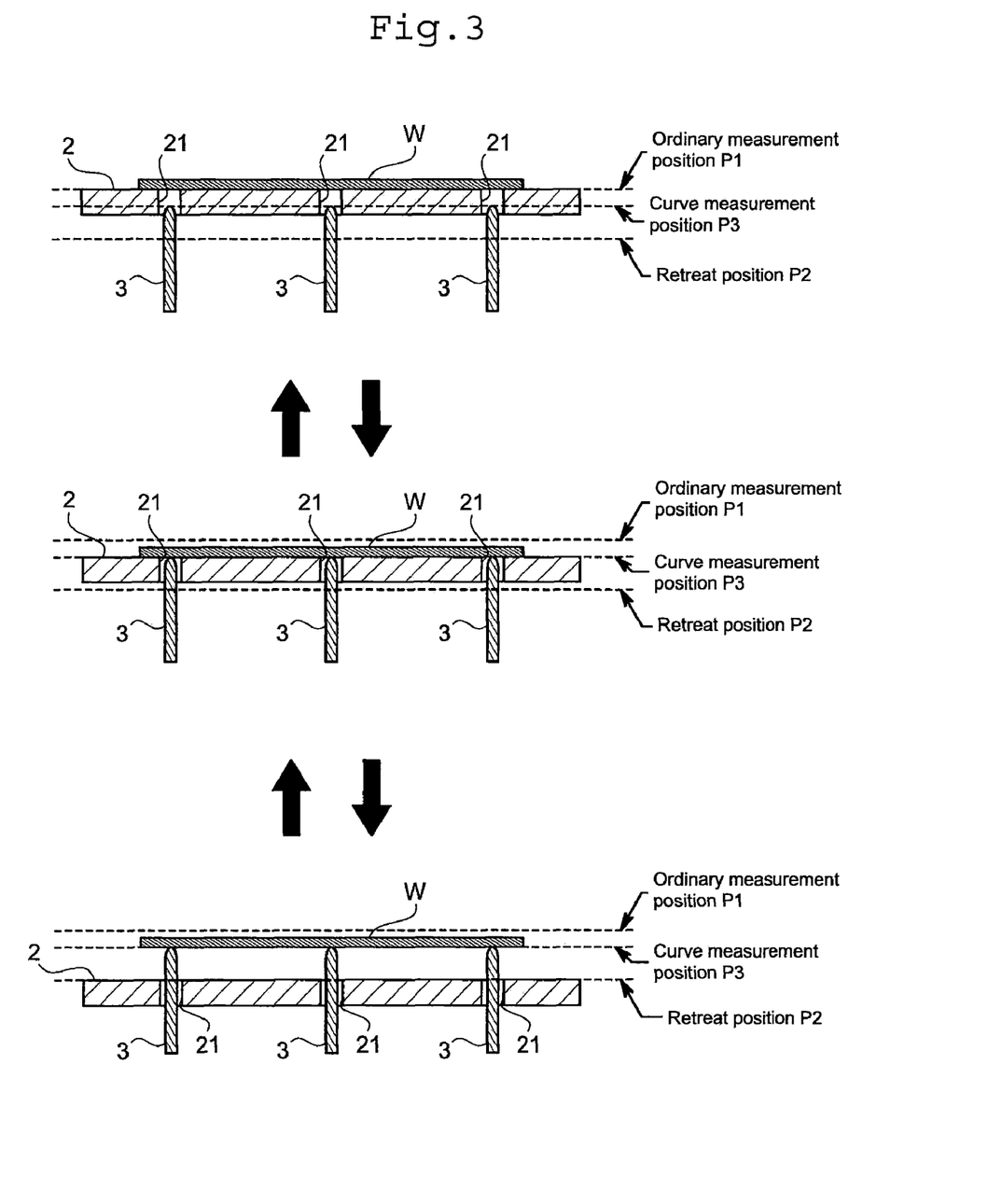
FIG. 3 is a schematic diagram showing an operation performed by the substrate measuring stage according to the embodiment.
Figure 4:
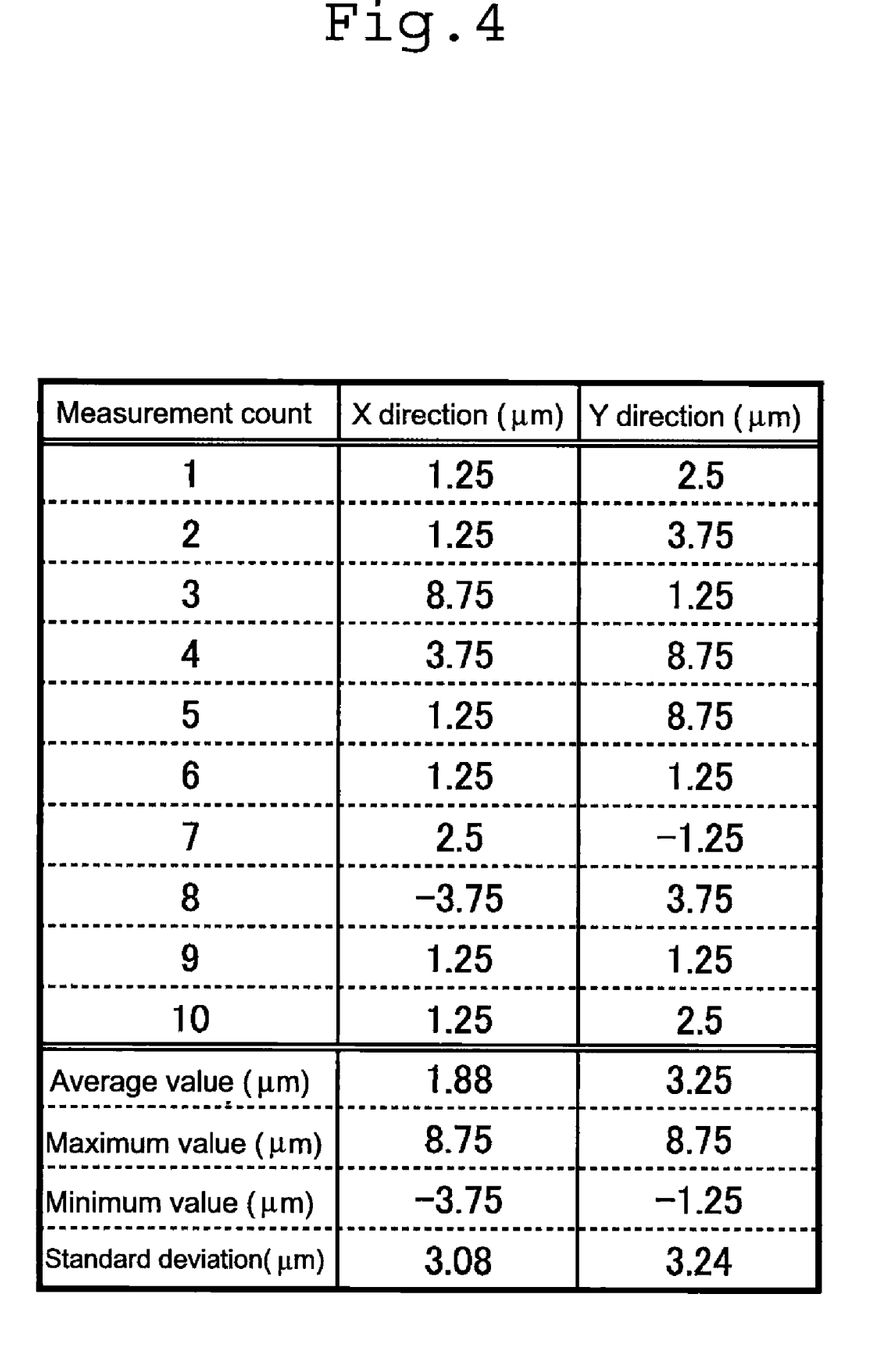
FIG. 4 is a table showing an experimental result of position reproducibility of the substrate measuring stage according to the embodiment.

Embodiments of the present invention will be described hereinafter referring to the accompanying drawings. FIG. 1 is a typical configuration diagram of a substrate measuring stage 1 according to an embodiment of the present invention. FIG. 2 is a plane view of a mounting board 2. FIG. 3 is a schematic diagram showing an operation performed by the substrate measuring stage 1. FIG. 4 is a table showing an experimental result of position reproducibility using the substrate measuring stage 1.

Device Configuration

The substrate measuring stage 1 according to the present embodiment is used for a curve measuring system 7 measuring a curve of a substrate W and an ordinary measuring system 6 measuring physical quantities and/or chemical quantities of the substrate W other than the curve thereof. Examples of the substrate W include a glass substrate for FPD, and a semiconductor wafer typified by a silicon substrate. A substrate measuring equipment is configured to include the substrate measuring stage 1, the ordinary measuring system 6, and the curve measuring system 7.

In the present embodiment, the ordinary measuring system 6 measures a thickness of a film formed on a surface of the substrate W and a thickness of the substrate W among the physical quantities and the chemical quantities other than the curve of the substrate W. The ordinary measuring system 6 is, for example, an ellipsometer. In FIG. 1, reference symbol 61 denotes a laser light source or a white light source and 62 denotes a photodetector.

The curve measuring system 7 is, for example, a laser displacement meter. The curve measuring system 7 is configured to include a light irradiation part including a laser light source or the like of a He—Ne laser and a photodetector such as a position detection sensor (PSD). The light irradiation part and the photodetector are formed integrally with each other.

Specifically, the substrate measuring stage 1 according to the present embodiment is used for a stress meter that measures a thickness of the film formed on the substrate W and, at the same time, measures the curve of the substrate W, and measures a stress applied on the substrate W as a result of formation of the film. As shown in FIG. 1, the substrate measuring stage 1 includes a mounting board 2 mounting thereon the substrate W and movable between an ordinary measurement position P1 for the ordinary measuring system 6 and a retreat position P2 away downward from the ordinary measurement position P1, a plurality of support members 3 that can be penetrated through through-holes 21 provided in the mounting board 2, respectively and fixed to a curve measurement position P3 for the curve measuring system 7, and a vertical movement mechanism (lifting mechanism) 4 moving up and down the mounting board 2 between the ordinary measurement position P1 and the retreat position P2. A horizontal movement mechanism (not shown) moving the vertical movement mechanism 4 in an XY axis direction, i.e., a horizontal direction is provided below the vertical movement mechanism 4. The horizontal movement mechanism can change a measurement position of the substrate W in an XY direction.

The mounting board 2, the support members 3, and the vertical movement mechanism 4 will be described.

The mounting board 2, on which the substrate W is mounted, moves between the ordinary measurement position P1 at which the ordinary measuring system 6 measures the substrate W and the retreat position P2 set to be away downward from the ordinary measurement position P1 in a vertical direction. In the present embodiment, the mounting board 2 has a circular shape in a plane view (see FIG. 2). Alternatively, the mounting board 2 may have a shape such as a rectangular shape other than the circular shape in the plane view.

The "ordinary measurement position P1" means a position on an upper surface of the mounting board 2 for making an ordinary measurement of the substrate W. Specifically, the ordinary measurement position P1 is a position on the upper surface of the mounting board 2 so that the ordinary measuring system 6 can make an ordinary measurement of the substrate W when the substrate W is mounted on the mounting board 2. Namely, if the substrate W is not mounted on the mounting board 2 located at the ordinary measurement position P1, the light irradiation part 61 of the ordinary measuring system 6 focuses on the surface of the substrate W.

The "retreat position P2" means a position at which the upper surface of the mounting board 2 is away downward from the ordinary measurement position P1 by a predetermined length. Specifically, the retreat position P2 is a position at which the upper surface of the mounting board 2 is located downward of the curve measurement position P3 to be described later. The position away by the predetermined length means a downward position sufficient to keep a lower surface of the substrate W out of contact with the upper surface of the mounting board 2 even if the substrate W supported on the support members 3 is bent on the support members 3.

The mounting board 2 according to the present embodiment is a vacuum chuck board sucking the substrate W. As shown in FIGS. 1 and 2, a plurality of through-holes 21 is provided in the mounting board 2 to correspond to the support members 3 at positions opposed to the support members 3 to be described later, respectively. In the present embodiment, three through-holes 21 are provided to be concentric with the center of the mounting board 2.

The mounting board 2 vertically moves up and down between the ordinary measurement position P1 and the retreat position P2 by the vertical movement mechanism 4 to be described later.

The support members 3 support the substrate W for measuring the curve of the substrate W. The support members 3 are independent of a movement of the mounting board 2 and tips of support ends of the support members 3 are fixed. The support members 3 in the present embodiment are support pins, and the support ends are tip ends of the support pins. A height adjustment mechanism 5, to be described later, adjusts a height of each support pin 3 so that one end of each support pin 3 is fixed to a stage base 100 via a member vertically built on the support base 100 and so that a tip of the other end thereof is located at the curve measurement position P3.

The "curve measurement position P3" means a position of the support end of each support pin 3 at which the curve measuring system 7 can measure the curve of the substrate W when the substrate W is mounted on the support end of each support pin 3. Since the support end is the tip end of each support pin 3, the curve measurement position P3 is the position of the tip end of each support pin 3 at which the curve measuring system 7 can measure the curve of the substrate W when the substrate W is mounted on the tip end of each support pin 3. If a measuring process is carried out while moving the mounting board 2 between the ordinary measurement position P1 and the retreat position P2, the height of each support pin 3 does not change. Due to this, during the measuring process, a height of the curve measurement position P3 from the stage base 100 is also unchanged and fixed.

At this time, the difference in height between the ordinary measurement position P1 and the curve measurement position P3 falls within such a range as to have substantially no influence on the measurement of the curve. The difference in height therebetween is decided by the relationship with an optical system included in the curve measuring system 7 and, for example, 400 micrometers (μm). Alternatively, the difference may be smaller than 400 μm.

As shown in FIG. 1, the tip end of each support pin 3 has a spherical shape. In the present embodiment, as shown in FIG. 2, the three support pins 3 are provided to be located at vertexes of a regular triangle having the center of gravity coincident with a center of the mounting board 2, respectively. The support pins 3 are penetrated through the through-holes 21 provided in the mounting board 2, respectively according to a vertical movement of the mounting board 2.

The height adjustment mechanism 5 adjusting a height of each support pin 3 is provided on a lower end of each support pin 3.

The height adjustment mechanism 5 is configured to include a male screw 51 provided to be continuous to the lower end of each support pin 3 via a hexagonal portion 53 and a female screw 52 provided on the stage base 100. The female screw 52 is provided on a member vertically built on the stage base 100. By rotating the hexagonal portion 53 and mating the male screw 51 with the female screw 52, the tip end of the support pin 3 is vertically adjusted.

Specifically, the height adjustment mechanism 5 adjusts the height position of each support pin 3 to a position lower than the ordinary measurement position P1 by such a degree as not to influence the measurement of the curve or, in the present embodiment, by 400 μm lower than the ordinary measurement position P1.

The vertical movement mechanism 4 is provided on the stage base 100. The vertical movement mechanism 4 is a member changing a height of the mounting board 2 relatively to the stage base 100 and vertically moving the mounting board 2 between the ordinary measurement position P1 and the retreat position P2.

Specifically, the vertical movement mechanism 4 comprises a first linear guide 41 horizontally provided on the stage base 100, a wedge member 42 provided on the first linear guide 41 to be horizontally movable, a drive mechanism 43 provided on the stage base 100 and moving the wedge member 42 forward and backward, a second linear guide 44 provided on an inclined surface of the wedge member 42 along an inclination direction of the inclined surface, a third linear guide 45 provided on the stage base 100 in the vertical direction, and an elevator member 46 provided on the second linear guide 44 and the third linear guide 45 to be vertically movable. At least one of the wedge member 42 and the elevator member 46 includes an angle adjustment mechanism 462 that adjusts an angle of an installation surface of the wedge member 42 on which the second linear guide 44 is provided to an angle along an installation surface of the second linear guide 44 on which the wedge member 42 is provided or adjusts an angle of an installation surface of the elevator member 46 on which the second linear guide 44 is provided to an angle along an installation surface of the second linear guide 44 on which the elevator member 46 is provided. The mounting board 2 is provided on an upper surface of the elevator member 46.

The first, second, and third linear guides 41, 44, and 45 are cross roller guides configured to include first, second, and third long track rails 411, 441, and 451 and first, second, and third sliders 412, 442, and 452 slidably suspended on the track rails 411, 441, and 451, respectively.

The wedge member 42 is a member converting a horizontal force applied by the drive mechanism 43, to be described later, into a vertical force. As shown in FIG. 1, the wedge member 42 is provided on the first slider 412 of the first linear guide 41. The wedge member 42 has an inclined upper surface inclined downward along a forward direction (toward a tip end of the wedge member 42). Further, the drive mechanism 43 slidably moving the wedge member 42 on the first linear guide 41 is provided on a rear end of the wedge member 42.

The drive mechanism 43 is provided on the stage base 100 and uses a ball screw mechanism. The drive mechanism 43 includes a driver 431 fixed onto the stage base 100 by a holder, a ball screw shaft 432 rotatably coupled to an output shaft of the driver 431 by a coupling member, and a ball screw nut (not shown) provided on the wedge member 42 and mated with the ball screw shaft 432. As the driver 431, a motor such as a stepping motor or a member using a manual tab may be used.

With this structure, if the driver 431 rotates the output shaft of the driver 431, then the ball screw shaft 432 rotates by a predetermined angle via the coupling member, and the wedge member 42 moves in the horizontal direction (X axis direction) relatively to the stage base 100.

The second linear guide 44 is provided on the inclined surface of the wedge member 42 along an inclination direction of the inclined surface.

The elevator member 46, which moves in the vertical direction (Z axis direction), includes an elevator member main body 461 fixed to the third linear guide 45 and the angle adjustment mechanism 462 provided on the elevator member main body 461 and adjusting the angle of the installation surface of the elevator member 46 so that the installation surface of the elevator member 46 on which the second linear guide 44 is provided when the elevator member 46 is provided on the third linear guide 45 makes a face-contacts with a fixed surface (an installation surface) of the second linear guide 44 fixed to the wedge member 42 onto which surface the elevator member 46 is fixed.

The elevator member main body 461, which is attached to the third slider 452 of the third linear guide 45, moves relatively to the stage base 100 in the vertical direction.

The angle adjustment mechanism 462 includes an intermediate body 4621 fixed to the second linear guide 44, and a fixing part 4622 provided between the elevator member main body 461 and the intermediate body 4621 and holding and fixing an attitude of the intermediate body 4621 defined by the wedge member 42 and an attitude of the elevator member main body 461 defined by the third linear guide 45 via the second linear guide 44.

In this way, the elevator member 46 according to the present embodiment is separated into the elevator member main body 461 and the intermediate body 4621 and the intermediate body 4621 is movably fixed to the second linear guide 44. It is to be noted that the installation surface of the elevator member 46 on which the second linear guide 44 is provided is the same as an installation surface of the intermediate body 4621 on which the second linear guide 44 is provided. Accordingly, to adjust the angle of the installation surface of the elevator member 46 on which the second linear guide 44 is provided means to hold and fix the attitudes of the intermediate body 4621 and the elevator member 46.

Namely, as described, if the intermediate body 4621 is fixed to the elevator member main body 461, the angle of the installation surface of the elevator member 46 on which the second linear guide 44 is provided when the elevator member 46 is provided on the third linear guide 45 is adjusted to an angle along the fixed surface (installation surface) of the second linear guide 44 on which a moving stage is provided.

The intermediate body 4621 is provided on the second linear guide 44 or specifically provided on the second slider 442 of the second linear guide 44, and moves relatively to the inclined surface of the wedge member 42.

The fixing part 4622 according to the present embodiment is provided at one of the intermediate body 4621 and the elevator member main body 461, and configured to include a plurality of pressure members tip ends of which pressure-contact with and clip the other one of the intermediate body 4621 or the elevator member main body 461 therebetween.

The fixing part 4622 moves forward or backward with respect to the other one of the intermediate body 4621 and the elevator member main body 461 to absorb dimensional error, error in machining or the like when fixing. For example, as shown in FIG. 1, the fixing part 4622 is provided at the elevator member main body 461, contacts with an upper surface, a lower surface, one end surface, and the other end surface of the intermediate body 4621 and fixes the intermediate body 4621 to the elevator member main body 461. Each pressure member 4622 is a metal screw and a tip end of the pressure member pressure-contacts with a flat portion of the intermediate body 4621. The tip end of each pressure member 4622 is worked into a spherical shape.

An operation performed by the substrate measuring stage 1 according to the present embodiment will be described as well as substrate measuring procedures referring to FIG. 3.

(1) Procedures from "Measurement of Thickness" to "Measurement of Curve"

First, a horizontal movement mechanism adjusts the position of the entire substrate measuring stage 1 in the XY direction. The drive mechanism 43 adjusts a position of the mounting board 2 of the substrate measuring stage 1 in the Z direction. The ordinary measuring system (ellipsometer) 6 measures a thickness of the film formed on the substrate W mounted on the mounting board 2. While the substrate W is attached onto the substrate W to measure a pressure of the film, the measurement is made without moving the substrate measuring stage 1 in the XY direction. At this time, the position of the mounting board 2 in the Z direction is the ordinary measurement position P1.

After end of measuring the thickness of the film, the support pins 3 penetrate through the through-holes 21 of the mounting board 2, respectively, protrude from the upper surface of the mounting board 2, and support the substrate W as the drive mechanism 43 moves the mounting board 2 from the ordinary measurement position P1 to the retreat position P2 in a state in which the mounting board 2 is located at the ordinary measurement position P1 and the substrate W is mounted on the mounting board 2. In this way, the position of the substrate W moves from the position at which the substrate W is mounted on the mounting board 2 to the position at which the substrate W is supported on the support pins 3. Thereafter, the curve measuring system (laser displacement meter) 7 measures the curve of the substrate W supported on the support pins 3.

(2) Procedures from "Measurement of Curve" to "Measurement of Thickness"

The horizontal movement mechanism adjusts the position of the entire substrate measuring stage 1 in the XY direction. Since the positions of the support pins 3 are adjusted to the curve measurement position P3 in advance, there is no need to adjust the positions of the support pins 3 whenever a measurement is made. The curve measuring system (laser displacement meter) 7 measures the curve of the substrate W supported on the support pins 3. During this curve measurement, the horizontal movement mechanism moves the substrate measuring stage 1 in the XY direction and the curve measuring system (laser displacement meter) 7 measures the curve of the substrate W while irradiating a laser beam onto the surface of the substrate W to scan the substrate W. At this time, the position of the substrate W in the XY direction the curve of which is measured by the curve measuring system (laser displacement meter) 7 is acquired from a rotary encoder or a linear encoder (not shown) provided in a motor (not shown) of the horizontal movement mechanism and stored as well as the curve measured at the position. Furthermore, the substrate W is moved in the XY direction and the curve of the entire surface of the substrate W is measured.

The measurement of the curve may be made either by discretely setting the position of the substrate W in the XY direction or by continuously scanning the substrate W.

After end of measuring the curve, the support pins 3 penetrate through the respective through-holes 21 of the mounting board 2, respectively and is buried in the upper surface of the mounting board 2, and the mounting board 2 holds thereon the substrate W as the drive mechanism 43 moves the mounting board 2 from the retreat position P2 to the ordinary measurement position P1 in a state in which the mounting board 2 is located at the retreat position P2 and the support pins 3 support the substrate W. In this way, the position of the substrate W moves from the position at which the substrate W is supported on the support pins 3 to the position at which the substrate W is mounted on the mounting board 2. Thereafter, the ordinary measuring system (ellipsometer) 6 measures the thickness of the film formed on the substrate W mounted on the mounting board 2.

An experimental result of position reproducibility of the substrate the position of which moves from the position at which the substrate is supported on the support pins to the position at which the substrate is mounted on the mounting board or vice versa using the substrate measuring stage according to the present embodiment will next be described.

With the substrate measuring stage having the conventional structure, that is, the substrate measuring stage structured so that the support pins moves up and down to lift the substrate from the mounting board, a horizontal position of the substrate on the mounting board is displaced from that of the substrate on the support pins by about 100 µm to 200 µm.

The substrate measuring stage 1 according to the present invention was used to move the mounting board 2 up and down between the ordinary measurement position P1 and the retreat position P3, thereby moving the position of the substrate W from the position on the mounting board 2 to the position on the support pins 3. FIG. 4 shows a result of performing this operation ten times in all.

As evident from FIG. 4, a displacement of the substrate W in the X axis direction after moving the position of the substrate W from the position on the mounting board 2 to the position on the support pins 3 is 1.88 µm on average, and the displacement thereof in a Y axis direction is 3.25 µm on average. Obviously, the displacement of the substrate W in the XY direction (horizontal direction) is far smaller than that according to a conventional technique.

Advantages of the Present Embodiment

In the substrate measuring stage 1 according to the present embodiment configured as described so far, each support pin 3 is fixed to the curve measurement position P3, so that the position reproducibility of each support pin 3 can be improved. Further, it is possible to prevent the substrate W from being horizontally displaced when the position of the substrate W moves from the position on the mounting board 2 to the position on the support pins 3. Therefore, if the measurement result of the measurement of the curve is compared with that of the ordinary measurement such as the measurement of the thickness of the film, the both measurement results can be effectively used. Moreover, a vertical movement mechanism for the support pins 3 can be dispensed with, whereby the substrate measuring stage 1 can be made small in size and manufactured at low cost.

Furthermore, the vertical movement mechanism 4 for the mounting board 2 can adjust the angle of the installation surface of the elevator member 46 or the wedge member 42 on which the second linear guide 44 is provided so that the elevator member 46 can move vertically on the third linear guide 45 as the wedge member 42 horizontally moves on the first linear guide 41. It is, therefore, possible to realize a high accuracy and a high resolution without excessive constraints of the wedge member 42 and the elevator member 46 on the linear guides irrespective of a working accuracy, an attachment accuracy or the like of the linear guides and the other constituent elements of the substrate measuring stage 1. The curve measurement position P3 of each fixed support pin 3 can be thereby set as close to the ordinary measurement position P1 of the mounting board 2 as possible. Besides, the advantages of the embodiment can be made more conspicuous.

Moreover, the substrate measuring stage 1 can be simplified in structure and manufactured at low cost because of no need to use expensive guides such as air bearings. Besides, high rigidity can be ensured because of use of the cross roller guides.

Further, the support pins 3 are provided on the stage base 100 independently of one another and the height adjustment mechanism 5 is provided. According to the technique disclosed in Patent document 1, it is difficult to vertically move all the pins in parallel and it is useless to adjust the heights of the respective pins. According to the present embodiment, by contrast, the support pins 3 are fixed to the stage base 100 and unmovable, so that the heights of the support pins 3 can be independently changed and the curve measurement position P3 can be adjusted.

Another Modified Embodiment

The present invention is not limited to the present embodiment. In the modifications described below, constituent elements corresponding to those according to the preceding embodiment are denoted by same reference symbols, respectively.

For example, the vertical movement mechanism 4 according to the present embodiment employs the wedge member 42. Alternatively, the vertical movement mechanism 4 may employ the other mechanism.

In the present embodiment, the ordinary measuring system 6 measures a thickness of the film on the substrate W. Alternatively, the ordinary measuring system 6 may measure the other physical quantity or chemical quantity of the substrate W. For example, the ordinary measuring system 6 may measure a composition, a property, a structure, a state or the like of the substrate W either qualitatively or quantitatively, may analyze a defect or a foreign matter on the surface of the substrate W or may analyze the surface of the substrate W or a component of a film formed on the surface of the substrate W.

The support members 3 are not limited to the pins but can be formed into various shapes, e.g., long support members may be used. Furthermore, in the present embodiment, the three support members 3 are provided. Alternatively, four or more support members 3 may be provided or two support members 3 may be provided as long as the support members 3 are long members.

The substrate measuring stage 1 according to the present embodiment is configured so that the through-holes 21 are formed in the mounting board 2 and so that the support members 3 penetrate through the through-holes 21, respectively. Alternatively, concave portions depressed toward the center of the mounting board 2 in a plane view may be provided on edges of the mounting board 2 and the support members 3 may penetrate through the concave portions, respectively. In another alternative, the support members 3 may be fixed to surroundings of the mounting board 2 without providing the through-holes 21 or the concave portions in the mounting board 2.

The angle adjustment mechanism may be provided in the wedge member 42. In this case, the wedge member 42 includes a wedge main body fixed to the first linear guide 41 and the angle adjustment mechanism provided at the wedge main body and adjusting an angle of an installation surface on which the second linear guide 44 is provided to an angle along the second linear guide 44 fixed to the elevator member 46.

Namely, it suffices that at least one of the wedge member 42 and the elevator member 46 includes an angle adjustment mechanism that adjusts the angle of the installation surface of the wedge member 42 on which the second linear guide 44 is provided to the angle along the installation surface of the second linear guide 44 on which the wedge member 42 is provided or adjusts the angle of the installation surface of the elevator member 46 on which the second linear guide 44 is provided to the angle along the installation surface of the second linear guide 44 on which the elevator member 46 is provided.

In the present embodiment, the substrate W is simply mounted on the tip ends of the support pins 3 during the measurement of the curve. In this case, if the substrate measuring stage 1 is moved at high speed by the horizontal movement mechanism, the substrate W may possibly be displaced from the position at which the substrate W is supported on the support pins 3 due to inertia and the measurement position may possibly be changed. Due to this, there is no avoiding imposing a restriction on the moving velocity, with the result that the measurement of the curve cannot be made in short time.

Figure 5:
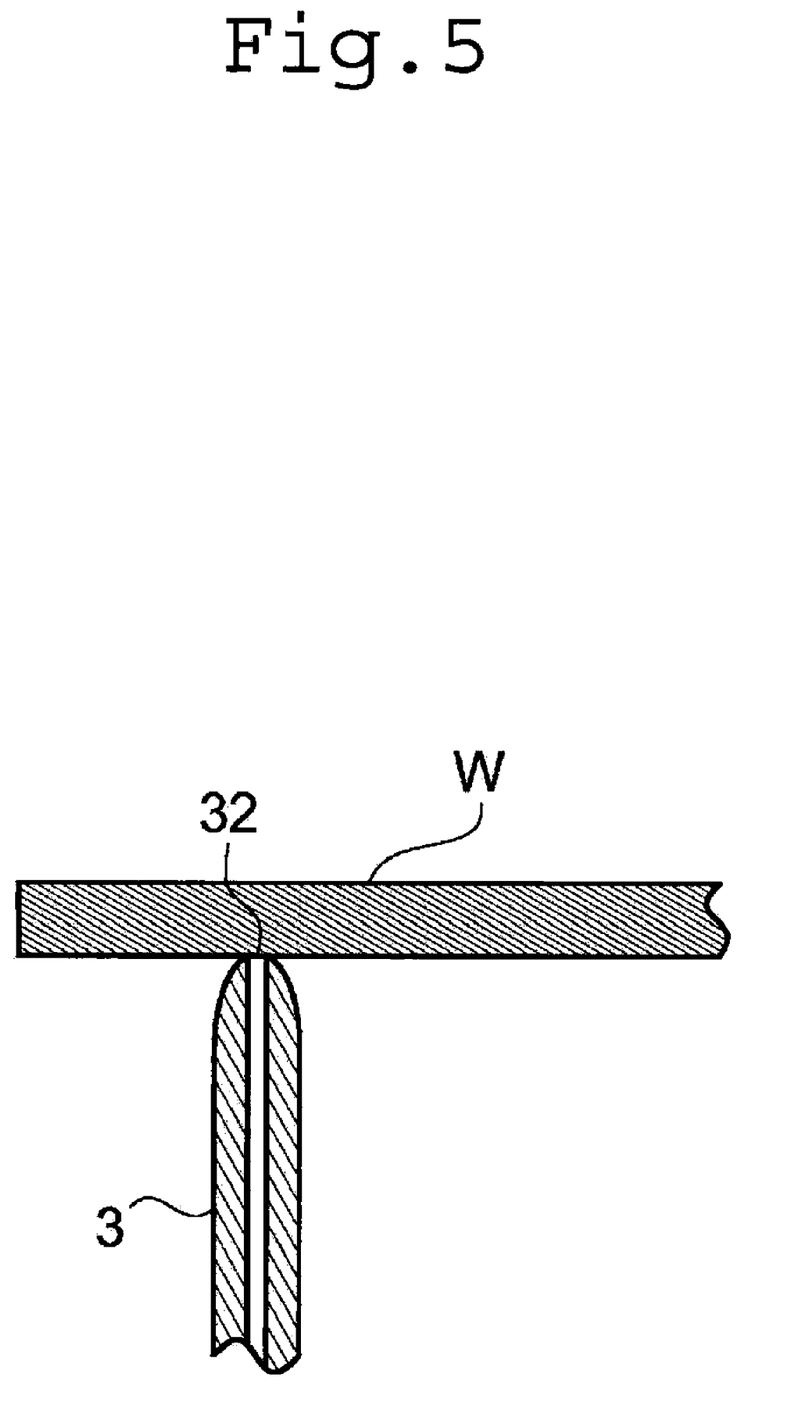
FIG. 5 is a schematic diagram showing a shape of a tip end of a support member according to another embodiment.

To solve this problem, a displacement prevention part 32 preventing the substrate W from being horizontally displaced is provided during measurement of the curve. Specifically, as shown in FIG. 5, a through-hole 32 serving as the displacement prevention part 32 is provided on the tip end of each support pin 3, and the substrate W is held by attracting the substrate W from the through-holes 32. Alternatively, by setting a friction coefficient of the support end of each support pin 3 high, the substrate W may be prevented from being horizontally displaced by the inertia generated by an acceleration of the horizontal movement mechanism.

In the present embodiment, the substrate W is supported by the three support pins 3 smaller in radius than the substrate W and provided concentrically as shown in FIG. 3. In this case, if one of the support pins 3 contacts with a portion of the substrate W which portion is to serve as a chip, the substrate W may possibly be damaged or a contamination may possibly occur on the substrate W. To solve this problem, the substrate measuring stage 1 may be configured so that the support pins 3 support an outer periphery of the substrate W which is to be discarded without being used as the chips.

Figure 6:
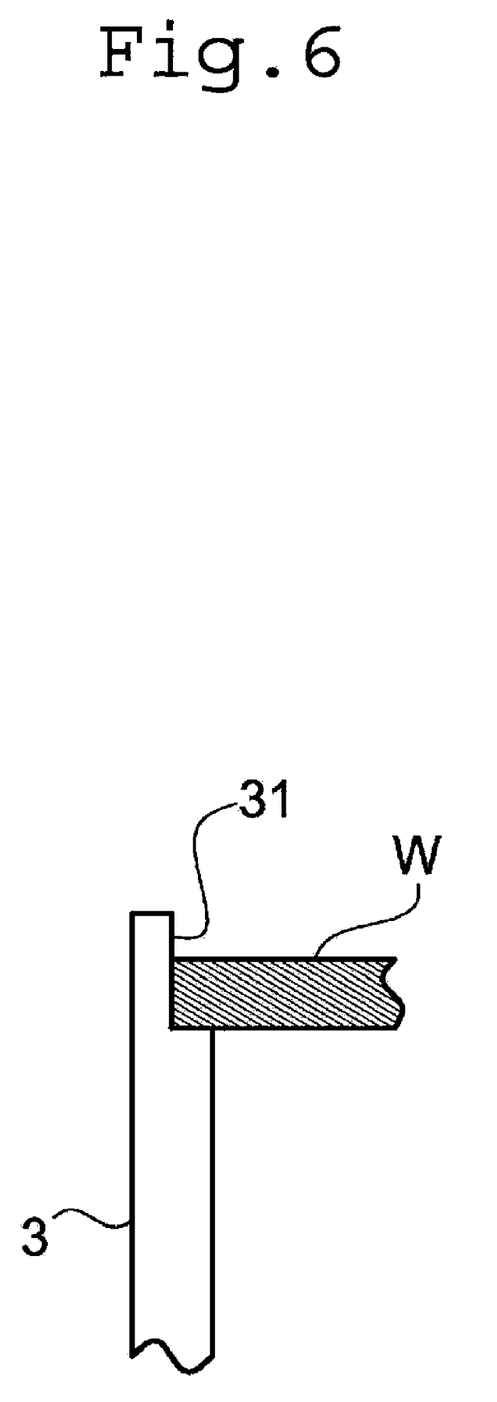
FIG. 6 is a schematic diagram showing a shape of a tip end of a support member according to further another embodiment.

To support the outer periphery of the substrate W on the support pins 3, three support pins 3 concentric with and equal in radius to the substrate W are arranged to form vertexes of a generally regular triangle, respectively. Namely, as shown in FIG. 6, generally semicylindrical protrusions 31 are formed to protrude upward of the support ends of the support pins 3 supporting the substrate W so as to coincide with side surfaces of the substrate W, respectively. By doing so, the center of the substrate W can be made coincident with a center of gravity of the regular triangle formed by the three support pins 3, thereby facilitating arranging the substrate W at a position suited for each measurement.

Figure 7:
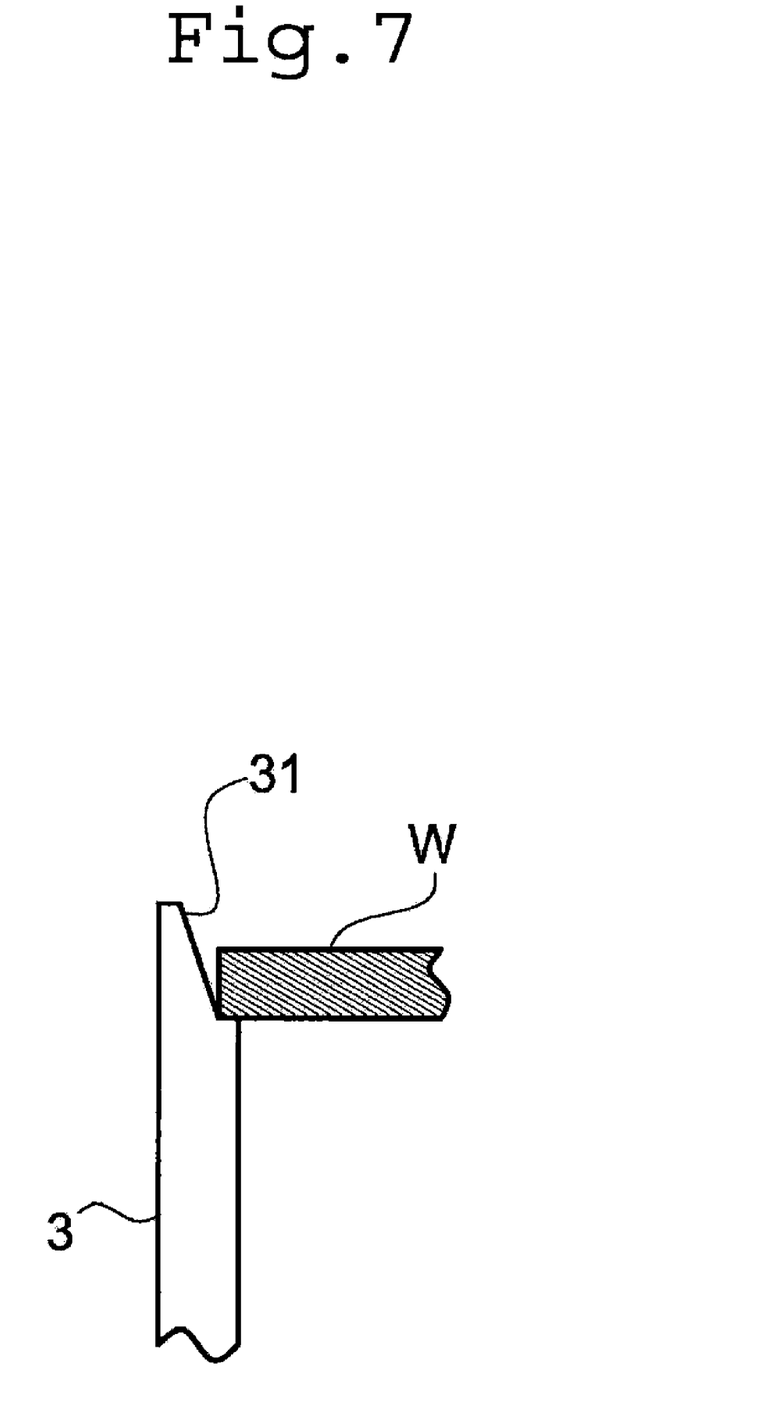
FIG. 7 is a schematic diagram showing a shape of a tip end of a support member according to a different embodiment.

As shown in FIG. 7, a surface of each protrusion 31 in contact with the side surface of the substrate W may be tapered. If the protrusions 31 are formed as shown in FIG. 7, a circle formed by the support pins 3 on a horizontal plane is larger than the substrate W at a position upward of the curve measurement position P3. This can facilitate mounting the substrate W on the support pins 3. Further, since the substrate W is fitted into the tapered surfaces of the protrusions 31, it is possible to facilitate positioning the center of the substrate W to a central position defined by the three support pins 3. Besides, since the outer periphery of the substrate W is caught up in the three support pins 3, this makes it advantageously difficult to displace the substrate W even if the substrate measuring stage 1 is moved at high speed.

In the present embodiment, the three support pins 3 are used on the stage. Alternatively, four or more support pins 3 may be used. In another alternative, three support pins 3 may be arranged on a circle having a certain radius in the form of a generally regular triangle to constitute a first support member group A1, and three support pins 3 may be arranged on a circle having a radius smaller than a certain radius in the form of a generally regular triangle to constitute a second support member group A2. In FIG. 7, a height position of a tip end that is a support end of each of the support pins 3 in the first support member group A1 is set equal to the curve measurement position P3. A height position a tip end that is a support end of each of the support pins 3 in the second support member group A2 is set equal to a curve measurement position P4 between the curve measurement position P3 and the retreat position P2. For brevity, FIG. 8 does not show the central support pins 3.

Figure 8:
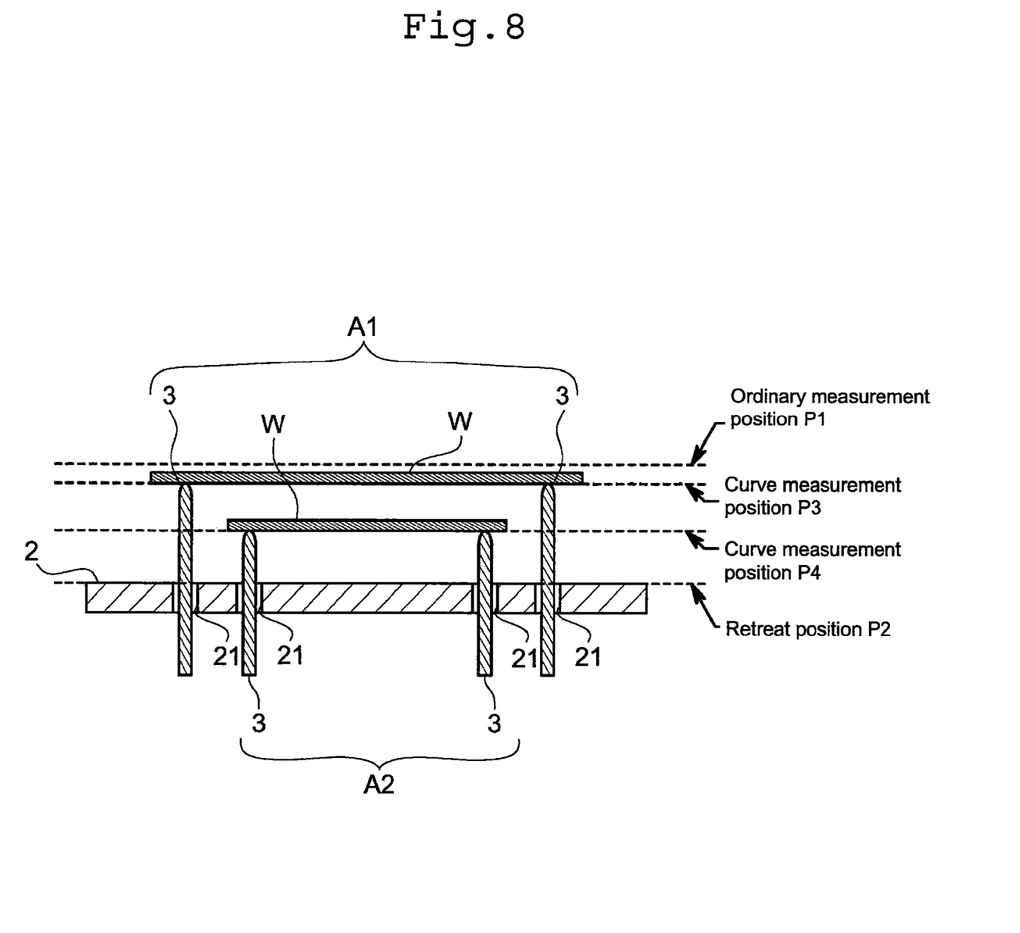
FIG. 8 is a schematic diagram showing arrangement of a support member according to a further different embodiment.

By so configuring, if the substrate W is mounted at the center of the mounting board 2, the center of the substrate W can be positioned at the center of the concentric circle on which the support pins 3 are arranged when the mounting board 2 is moved downward. Due to this, it is possible to facilitate measuring curves of a plurality of substrates W having various sizes without replacing stages or the like. Furthermore, since the curve measurement position P4 is located to be lower than the curve measurement position P3, the second support member group A2 does not contact with the substrate W when the substrate W is supported on the first support member group A1. It is, therefore, possible to prevent the second support member group A2 from influencing the measurement of the curve at the curve measurement position P3 or from contacting with the substrate W located at the curve measurement position P3 to cause contamination.

If the three support pins 3 are thermally deformed by a change in external temperature around the support pins 3 during the measurement of the curve, the mounted substrate W may possibly be inclined due to, for example, an expansion of only one of the three support pins 3. If the measurement is made in this state, the curve of the substrate W as well as the inclination of the substrate W generated by the thermal deformation of the support pins 3 is measured, resulting in deterioration in a curve measurement accuracy.

To solve this problem, a cutoff wall serving as a thermal deformation reduction mechanism may be provided around the support pins 3 so as to prevent an inflow of surrounding air having temperature change. Alternatively, the cutoff wall may be provided to surround the vertical movement mechanism 4.

In another alternative, a heater may be provided for the support pins 3 to keep a temperature of the support pins 3 to be constant and higher than that of the surrounding air. In this case, the support pins 3 can be easily kept at the certain temperature by controlling the heater to be turned on or off, thereby making it possible to prevent the substrate W from being inclined by the thermal deformation of the support pins 3.

To reduce a measurement error caused by the thermal deformation, the support pins 3 may be made of a material having a low coefficient of thermal expansion. More specifically, the material having a low coefficient of thermal expansion and capable of positioning the substrate W on the support pins 3 at predetermined positioning accuracy at temperature at which the substrate measuring stage 1 is used may be used as material of the support pins 3. Specific examples of such a material include super invar and glass having low coefficient of thermal expansion.

In the present embodiment, the curve of the entire surface of the substrate W is measured by the horizontal movement mechanism moving in the XY direction. Alternatively, a rotary stage may be used in place of the horizontal movement mechanism and the curve measuring system may be structured to be movable in a uniaxial direction so as to be able to measure the curve in a Rθ direction.

Furthermore, a part of or all of the present embodiment and the modifications may be appropriately combined. Needless to say, the present invention is not limited to the above-described embodiment but various changes and modifications can be made of the present invention within a scope of the invention.

DESCRIPTION OF REFERENCE NUMERALS

W Substrate
1 Substrate measuring stage
2 Mounting board
21 Through-hole
3 Support member (support pin)
31 Protrusion
32 Displacement prevention part
4 Vertical movement mechanism
5 Height adjustment mechanism
6 Ordinary measuring system
7 Curve measuring system
P1 Ordinary measurement position
P2 Retreat position
P3 Curve measurement position

What is claimed is:

1. A substrate measuring stage used for a curve measuring system measuring a curve of a substrate and an ordinary measuring system measuring each of or one of a physical quantity and a chemical quantity of the substrate other than the curve, comprising:
   a mounting board movable between an ordinary measurement position for the ordinary measuring system and a retreat position away from and downward of the ordinary measurement position;
   a support member having a support end supporting the substrate, a tip end of the support end being fixed to a curve measurement position for the curve measuring system irrespective of a movement of the mounting board; and
   a lifting mechanism moving the mounting board between the ordinary measurement position and the retreat position,
   wherein the curve measurement position is set between the ordinary measurement position and the retreat position.

2. The substrate measuring stage according to claim 1, wherein a difference between the curve measurement position and the ordinary measurement position falls within a range substantially having no influence on measurement of the curve.

3. The substrate measuring stage according to claim 1, comprising a height adjustment mechanism adjusting a height of the support member to correspond to the support member.

4. The substrate measuring stage according to claim 1, wherein the mounting board is a chuck board sucking the substrate.

5. The substrate measuring stage according to claim 1, wherein the support member includes a displacement prevention part preventing a displacement of the substrate.

6. The substrate measuring stage according to claim 5, wherein the displacement prevention part sucks the substrate.

7. The substrate measuring stage according to claim 1, wherein a plurality of support members constitute support member groups different in a size of the substrate to be supported, and the support member group supporting a small substrate is arranged inside of the support member group supporting a large substrate, and a curve measurement position of the support member group supporting a small substrate is set lower than a curve measurement position of the support member group supporting a large substrate.

8. The substrate measuring stage according to claim 1, wherein the ordinary measuring system is an ellipsometer measuring a thickness of a film formed on the substrate.

9. A substrate measuring equipment using the substrate measuring stage according to claim 1.

* * * * *